United States Patent [19]

Pallaro

[11] 4,403,162
[45] Sep. 6, 1983

[54] INSULATING ELEMENT FOR ELECTRIC MOTOR WINDINGS, AND MOTOR PROVIDED WITH SUCH ELEMENTS

[75] Inventor: Gino Pallaro, Chieri, Italy

[73] Assignee: Aspera S.p.A., Castelnuovo Don Bosco, Italy

[21] Appl. No.: 320,897

[22] Filed: Nov. 12, 1981

[30] Foreign Application Priority Data

Nov. 19, 1980 [IT] Italy .............................. 68765 A/80

[51] Int. Cl.³ ............................................. H02K 3/34
[52] U.S. Cl. .................................... 310/194; 310/71; 310/215; 336/206
[58] Field of Search ................... 310/194, 71, 45, 192, 310/42, 260, 184, 215; 336/199, 185, 206, 208

[56] References Cited

U.S. PATENT DOCUMENTS

| 3,219,857 | 11/1965 | Fisher  | 310/71  |
|-----------|---------|---------|---------|
| 3,748,510 | 7/1973  | McNeal  | 310/71  |
| 3,909,648 | 9/1975  | Clark   | 310/192 |
| 4,335,325 | 6/1982  | Miller  | 310/214 |

FOREIGN PATENT DOCUMENTS

| 2232862 | 9/1975 | France | 310/71 |
| 2390845 | 12/1978 | France | 310/71 |
| 1056650 | 1/1967 | United Kingdom | 310/71 |

*Primary Examiner*—R. Skudy
*Attorney, Agent, or Firm*—Sughrue, Mion, Zinn, Macpeak and Seas

[57] ABSTRACT

Two different stator windings of an electric motor are separated by insulating elements of die-cut sheet material. Each of these elements comprises a pair of end panels which separate the windings at the two ends of the stator, and a series of parallel strips which interconnect the end panels and each of which extends within one of the stator slots. One of the end panels has, extending from its edge opposite that from which the strips extend, at least two consecutive flaps folded one over the other in the manner of a sleeve. The sleeves of the insulating elements receive the joins between the wires of the windings and the associated supply leads.

2 Claims, 3 Drawing Figures

U.S. Patent
Sep. 6, 1983
4,403,162
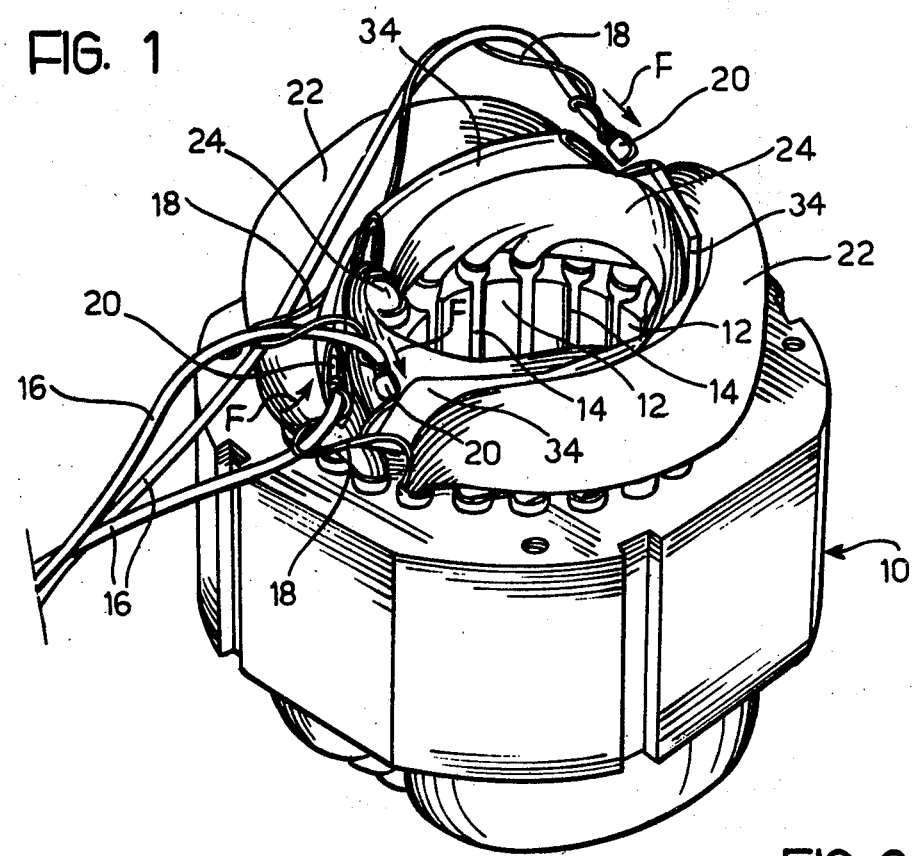
FIG. 1
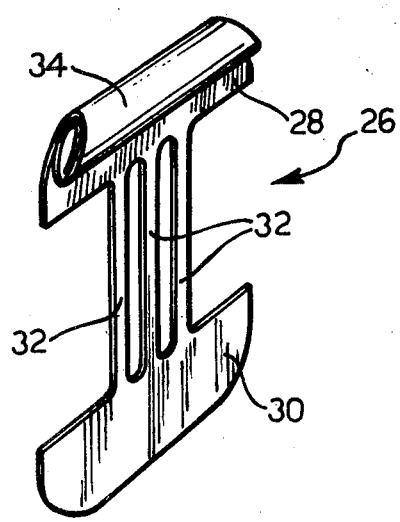
FIG. 2
FIG. 3

INSULATING ELEMENT FOR ELECTRIC MOTOR WINDINGS, AND MOTOR PROVIDED WITH SUCH ELEMENTS

The present invention relates to an insulating element of die-cut sheet material for electric motor stators, of the type comprising a pair of end panels intended to separate two different windings of the stator of the two ends of this latter, and a series of parallel strips interconnecting the end panels and each intended to extend within one of the stator slots.

In refrigerator compressors, and in many other pieces of apparatus, asynchronous electric motors are used the stators of which have a running winding and a starter winding. It is convenient that these two windings be separated by insulating elements both at their ends and within the stator slots in order to provide a guarantee against short circuits between one winding and the other: the insulating varnish of the copper wires does not, in fact, offer a total guarantee from this point of view because of the possible small local defects which it can have. These possible defects are of no practical importance for the purpose of insulating between one turn and another of the same winding given the small voltage difference, whilst they can give rise to more or less complete short circuits across the two windings between which the whole supply voltage can exist.

In motors with two windings, of the type considered, such as those used in refrigerator compressors, insulating elements of the type initially mentioned are used in order to separate the two windings from one another, these elements being normally made of die-cut sheet polyester. Insulating elements of this type are known from U.S. Pat. No. 3,909,648.

During the final stage in the manufacture of stators of the type considered, the two windings are connected with their associated external supply leads. In the case of a single phase motor with two windings two terminal wires, one belonging to the running winding and the other to the starter winding, are connected in common to one of the supply leads, whilst the other terminal wire of each winding is separately connected to a respective other lead. These connections are made by twisting together and/or soldering and/or pinching the bared ends of the wires of the windings and the leads in a cable clip.

Once these joins have been made it is necessary to insulate them, and for this purpose they are covered with a self adhesive insulating tape or else they are sheathed in a heat shrinking insulating tube or in a separate insulating envelope.

These operations represent, in the manufacturing cycle, a cost item which it would be desirable to reduce. Moreover, the joins insulated in this way are, so to speak, "flying" joins, that is to say they are not firmly positioned.

The object of the present invention is precisely that of reducing the cost of the operation of insulating the joins and at the same time of obtaining a firm position of the joins themselves by using for this purpose the same insulating elements which separate the stator windings.

According to the invention this object is achieved by means of an insulating element of the type initially mentioned, characterised in that one of the end panels has, extending from its edge opposite that from which the strips extend, at least two consecutive flaps, one of which is connected to the panel along a fold line coincident with the said edge, and which are connected together by a fold line parallel to the preceding one, in such a way that the flaps are folded over one another in the form of a sleeve to receive a join between the conductors of at least one winding and one of the supply leads for that winding.

Due to this inventive solution, in order to insulate the said joins it is sufficient to insert them into the sleeves already positioned during the intermediate stage of manufacture in which, after the formation of one of the windings and before the formation of the other winding, the insulating elements have been fitted. Since the sleeves are located in fixed positions between the end portions of the windings, the joins inserted therein also remain stably positioned.

The invention also relates to an electric motor, particularly an asynchronous motor having two stator windings, respectively a running winding and a starter winding, separated by insulating elements of die-cut sheet material according to the invention.

The invention will be better understood from a reading of the following detailed description with reference to the attached drawings, given by way of non limitative example and in which:

FIG. 1 is a perspective view of a stator of a single phase asynchronous electric motor with two windings, FIG. 2 is a perspective view of one of the insulating elements which separate the two windings of the stator of FIG. 1, and FIG. 3 is a developed plan view of the insulating element of FIG. 2.

In FIG. 1 there is shown a stator of an electric motor, which comprises an armature 10 constituted by a stack of magnetic laminations. Within the armature 10 there are formed pole pieces 12 separated by longitudinal slots 14.

Along the slots 14 extend the active parts of two stator windings, respectively a running winding and a starter winding. These windings can be externally supplied by means of three leads 16. The bared ends of the leads 16 are joined to the bared ends of the wires, indicated 18, of the two stator windings. These joins are formed by pinching the said bared ends together by means of sheet copper cable clips indicated 20. In particular, a join is formed between one of the leads 16 and two terminal wires 18, one being of the running winding and the other of the starter winding. The other two joins respectively interconnect another of the leads 16 with the other terminal wire of one of the windings.

In FIG. 1 the end portions of the running and starter windings to which the leads 16 are connected have been indicated 22 and 24 respectively. The running winding, the end portions of which are indicated 22, is the outer one, and the starter winding, the end portions of which are indicated 24, is the inner one.

The two windings are separated by insulating elements of die-cut sheet material, normally polyester, such as that generally indicated 26 in FIG. 2.

The element 26 comprises a pair of end panels 28 and 30 interconnected by a series of parallel strips 32. The strips 32 are intended to extend within the slots 14 of the armature 10 to separate the active parts of the two windings, and the end panels 28 and 30 are intended to separate the end portions of these windings. In particular, the panel 28 is intended to separate the end portions 22 and 24 on the end of the stator which has the terminal wires 18 of the windings and where the leads 16 are connected, whilst the panel 30 is intended to separate the winding end portions at the other end of the stator.

According to the invention, an insulating sleeve 34 is integrally formed with the element 26 on the end panel 28, this sleeve being intended to receive one of the joins, constituted by one of the cable clips 20, between an end of one of the leads 16 and at least one of the terminal wires 18 of the stator windings. The arrangement of the sleeves 34 of the insulating elements is visible in FIG. 1: the said joins are shown on the point of being inserted into respective sleeves 34, as indicated by the arrows F. This operation of insertion of the joins into the sleeves is all that is necessary to insulate these joins.

An insulating element such as that illustrated in FIG. 2 is obtained by means of die-cutting from a sheet of insulating material (normally polyester). In FIG. 3 the end panels have again been indicated with the reference numerals 28 and 30, and the connection strips with the reference numeral 32. The sleeve 34 of FIG. 2 is formed by three consecutive flaps 36, 28 and 40 which extend from the edge of the panel 28 opposite that from which the strips 32 extend. The flap 36 is connected to the panel 28 by a fold line 42 and another two fold lines 44 and 46 interconnect the flaps 36 and 38, and the flaps 38 and 40 respectively. These fold lines 42, 44 and 46 are formed in such a way that the flaps 40 can be folded over one another and against the end panel 28, starting from the flap 40 and folding in the same sense such as to constitute the sleeve 34 of FIG. 2.

A convenient technique for the manufacture of the insulating elements 26 consists in starting from a strip of material to be die-cut and in first subjecting an edge of this strip to a triple folding along the lines which, in the die-cut elements will constitute the lines 42, 44 and 46, and in effecting the die-cutting with the edges of the sheet already folded so as to obtain the sleeve 34 already folded upon the die-cutting operation.

The curvature imparted to the end panel 28 when it is inserted between the end portions 22 and 24 of the windings subsequently serves to preserve the form of the sleeve 34, preventing the flaps 36, 38 and 40 from unrolling or unfolding.

In a simpler embodiment, in order to form a sleeve it could be sufficient to use only two flaps such as 36 and 38, and the other flap 40 could be dispensed with.

I claim:

1. An electric motor, particularly an asynchronous motor including two stator windings having curved end portions, respectively a running winding and a starter winding, separated by insulating elements of die-cut sheet material, wherein at least one such insulating element comprises a pair of end panels each of which is inserted between two adjacent curved end portions of said running winding and said starter winding at opposite ends of the motor, and a series of parallel strips inter-connecting the end panels and each of which extends along one of the stator slots, and wherein one of the end panels has, extending from its edge opposite that from which the strips extend, at least two consecutive flaps one of which is connected to the panel by means of a fold line coincident with the said edge and which are connected together by a fold line parallel to the preceding one, in such a way that the flaps are folded over one another in the form of a sleeve which receives a join between the conductors of at least one winding and one of the supply leads of the same winding, said one end panel having a curvature imparted thereto by said curved end portions between which it is inserted whereby the form of the sleeve is preserved while preventing the flaps from unrolling and unfolding.

2. An electric motor as claimed in claim 1, wherein said at least one insulating element includes three said consecutive flaps interconnected by fold lines and folded over one another.

* * * * *